United States Patent
Nagano et al.

(10) Patent No.: US 12,163,437 B2
(45) Date of Patent: Dec. 10, 2024

(54) INDUSTRIAL PLANT MONITORING DEVICE, INDUSTRIAL PLANT MONITORING METHOD, AND PROGRAM

(71) Applicant: MITSUBISHI HEAVY INDUSTRIES, LTD., Tokyo (JP)

(72) Inventors: Ichiro Nagano, Yokohama (JP); Mayumi Saito, Tokyo (JP); Keiji Eguchi, Tokyo (JP); Kuniaki Aoyama, Takasago (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/769,444

(22) PCT Filed: Nov. 17, 2020

(86) PCT No.: PCT/JP2020/042708
§ 371 (c)(1),
(2) Date: Apr. 15, 2022

(87) PCT Pub. No.: WO2021/131403
PCT Pub. Date: Jul. 1, 2021

(65) Prior Publication Data
US 2024/0125246 A1    Apr. 18, 2024

(30) Foreign Application Priority Data
Dec. 26, 2019    (JP) .................. 2019-236772

(51) Int. Cl.
F01D 21/00    (2006.01)
(52) U.S. Cl.
CPC ........ F01D 21/003 (2013.01); *F05D 2260/80* (2013.01)
(58) Field of Classification Search
CPC ........................ F05D 2260/80; F01D 21/003
(Continued)

(56) References Cited

U.S. PATENT DOCUMENTS 8,135,653 B2 * 3/2012 Sekiai .................. G05B 13/027
                                                    706/12
2022/0121192 A1 * 4/2022 Nagano .................. F01D 25/00

FOREIGN PATENT DOCUMENTS

JP    2011-060012    3/2011
JP    2020-166330    10/2020

OTHER PUBLICATIONS

International Search Report issued Jan. 12, 2021 in corresponding International Application No. PCT/JP2020/042708, with English Translation.
(Continued)

*Primary Examiner* — Aditya S Bhat
(74) *Attorney, Agent, or Firm* — Wenderoth, Lind & Ponack, L.L.P.

(57) ABSTRACT

A plant monitoring device (20) is provided with: a detection value acquisition unit (211) that acquires a bundle of detection values; a first Mahalanobis distance calculation unit (212) that calculates a first Mahalanobis distance by using as a reference a unit space generated on the basis of a bundle of past detection values; a first SN ratio calculation unit (214) that calculates a first SN ratio for each of a plurality of evaluation items; a second Mahalanobis distance calculation unit (215) that calculates a second Mahalanobis distance by increasing or decreasing each of the detection values; a second SN ratio acquisition unit (216) that converts the first SN ratio for each of the evaluation items and acquires a second SN ratio on the basis of the first and second Mahalanobis distances; and an addition unit (217) that calculates an added value of a plurality of the second SN ratios acquired within a prescribed period for each of the evaluation items.

9 Claims, 10 Drawing Sheets

(58) Field of Classification Search
USPC .......................................................... 702/182
See application file for complete search history.

(56) References Cited

OTHER PUBLICATIONS

Written Opinion of the International Searching Authority issued Jan. 12, 2021 in corresponding International Application No. PCT/JP2020/042708, with English Translation.

* cited by examiner

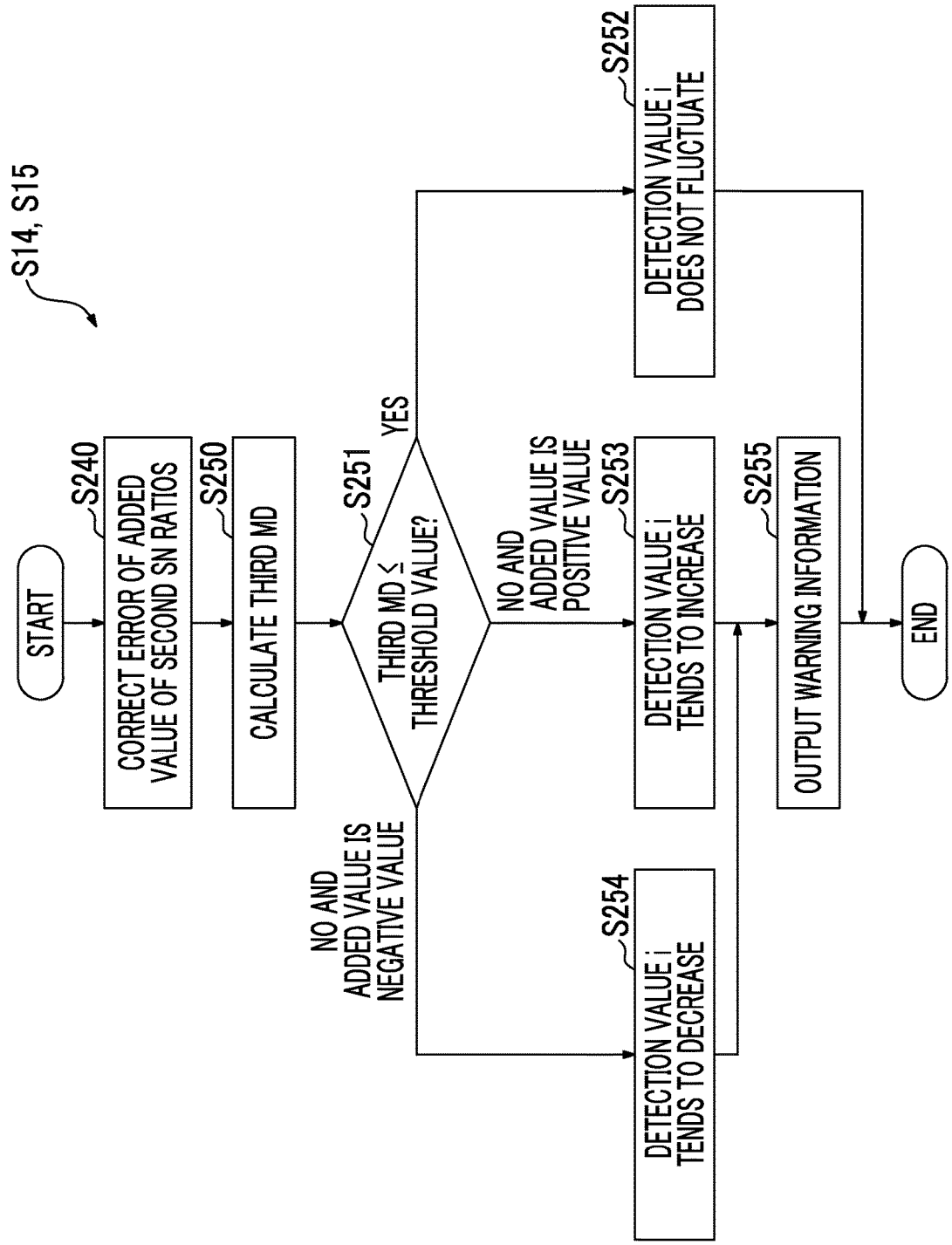

INDUSTRIAL PLANT MONITORING DEVICE, INDUSTRIAL PLANT MONITORING METHOD, AND PROGRAM

CROSS-REFERENCE TO RELATED APPLICATIONS

This application is a U.S. national stage application of the PCT International Application No. PCT/JP2020/042708 filed on Nov. 17, 2020, which claims the benefit of foreign priority of Japanese Patent Application No. 2019-236772, filed on Dec. 26, 2019.

TECHNICAL FIELD

The present disclosure relates to a plant monitoring device, a plant monitoring method, and a program.

Priority is claimed on Japanese Patent Application No. 2019-236772 filed on Dec. 26, 2019, the content of which is incorporated herein by reference.

BACKGROUND ART

In various types of plants, such as a gas turbine power generation plant, a nuclear power generation plant, a chemical plant, and remote monitoring systems thereof, a system displaying important sensor values is used in order to monitor a long-term tendency of the plant. In such a system, it is necessary to carefully monitor the sensor values manually to learn the long-term tendency, which is a cause of delay in introducing mechanization and AI. For this reason, for example, in PTL 1, a system that monitors a long-term tendency of a plant by acquiring a regression equation indicating the long-term tendency, which is an index in consideration of a margin to a limit value of each of a plurality of sensor values and variations, is described. In the system, a time when the index for each sensor exceeds a predetermined threshold value, that is, a time when there is a possibility that an abnormality such as a failure occurs is predicted from the regression equation.

CITATION LIST

Patent Literature

[PIT 1] Japanese Unexamined Patent Application Publication No. 2011-60012

SUMMARY OF INVENTION

Technical Problem

However, in recent years, there has been a demand for a system that has higher versatility and generality and that allows easy learning of a long-term tendency for various plants having different specifications, operation conditions, and sensor types.

The present disclosure is devised in view of such problems, and provides a plant monitoring device, a plant monitoring method, and a program that allow easy learning of a long-term tendency while improving versatility and generality.

Solution to Problem

According to an aspect of the present disclosure, there is provided a plant monitoring device including a detection value acquisition unit that acquires a bundle of detection values, which is a collection of detection values for each of a plurality of evaluation items, a first Mahalanobis distance calculation unit that calculates a first Mahalanobis distance of the bundle of detection values with a unit space created by a bundle of past detection values as a reference, a first SN ratio calculation unit that calculates a first SN ratio for each of the plurality of evaluation items, a second Mahalanobis distance calculation unit that increases or decreases each of the plurality of detection values to calculate a second Mahalanobis distance corresponding to each increased or decreased detection value, a second SN ratio acquisition unit that acquires a second SN ratio by performing conversion of the first SN ratio for each of the evaluation items based on the first Mahalanobis distance and the second Mahalanobis distance, and an addition unit that calculates an added value of a plurality of the second SN ratios acquired in a predetermined period for each of the plurality of evaluation items.

According to another aspect of the present disclosure, there is provided a plant monitoring method including a step of acquiring a bundle of detection values, which is a collection of detection values for each of a plurality of evaluation items, a step of calculating a first Mahalanobis distance of the bundle of detection values with a unit space created by a bundle of past detection values as a reference, a step of calculating a first SN ratio for each of the plurality of evaluation items, a step of increasing or decreasing each of the plurality of detection values to calculate a second Mahalanobis distance corresponding to each increased or decreased detection value, a step of acquiring a second SN ratio by performing conversion of the first SN ratio for each of the evaluation items based on the first Mahalanobis distance and the second Mahalanobis distance, and a step of calculating an added value of a plurality of the second SN ratios acquired in a predetermined period for each of the plurality of evaluation items.

According to still another aspect of the present disclosure, there is provided a program that causes a computer of a plant monitoring device to execute a step of acquiring a bundle of detection values, which is a collection of detection values for each of a plurality of evaluation items, a step of calculating a first Mahalanobis distance of the bundle of detection values with a unit space created by a bundle of past detection values as a reference, a step of calculating a first SN ratio for each of the plurality of evaluation items, a step of increasing or decreasing each of the plurality of detection values to calculate a second Mahalanobis distance corresponding to each increased or decreased detection value, a step of acquiring a second SN ratio by performing conversion of the first SN ratio for each of the evaluation items based on the first Mahalanobis distance and the second Mahalanobis distance, and a step of calculating an added value of a plurality of the second SN ratios acquired in a predetermined period for each of the plurality of evaluation items.

Advantageous Effects of Invention

With the plant monitoring device, the plant monitoring method, and the program according to the present disclosure, it is possible to easily learn the long-term tendency while improving versatility and generality.

BRIEF DESCRIPTION OF DRAWINGS

FIG. 10 is a flowchart showing an example of processing of a plant monitoring device according to a second modification example of the present disclosure.

DESCRIPTION OF EMBODIMENTS

First Embodiment

Hereinafter, a plant monitoring device 20 according to a first embodiment of the present disclosure will be described with a reference to FIGS. 1 to 6.
(Overall Configuration)

Figure 1:
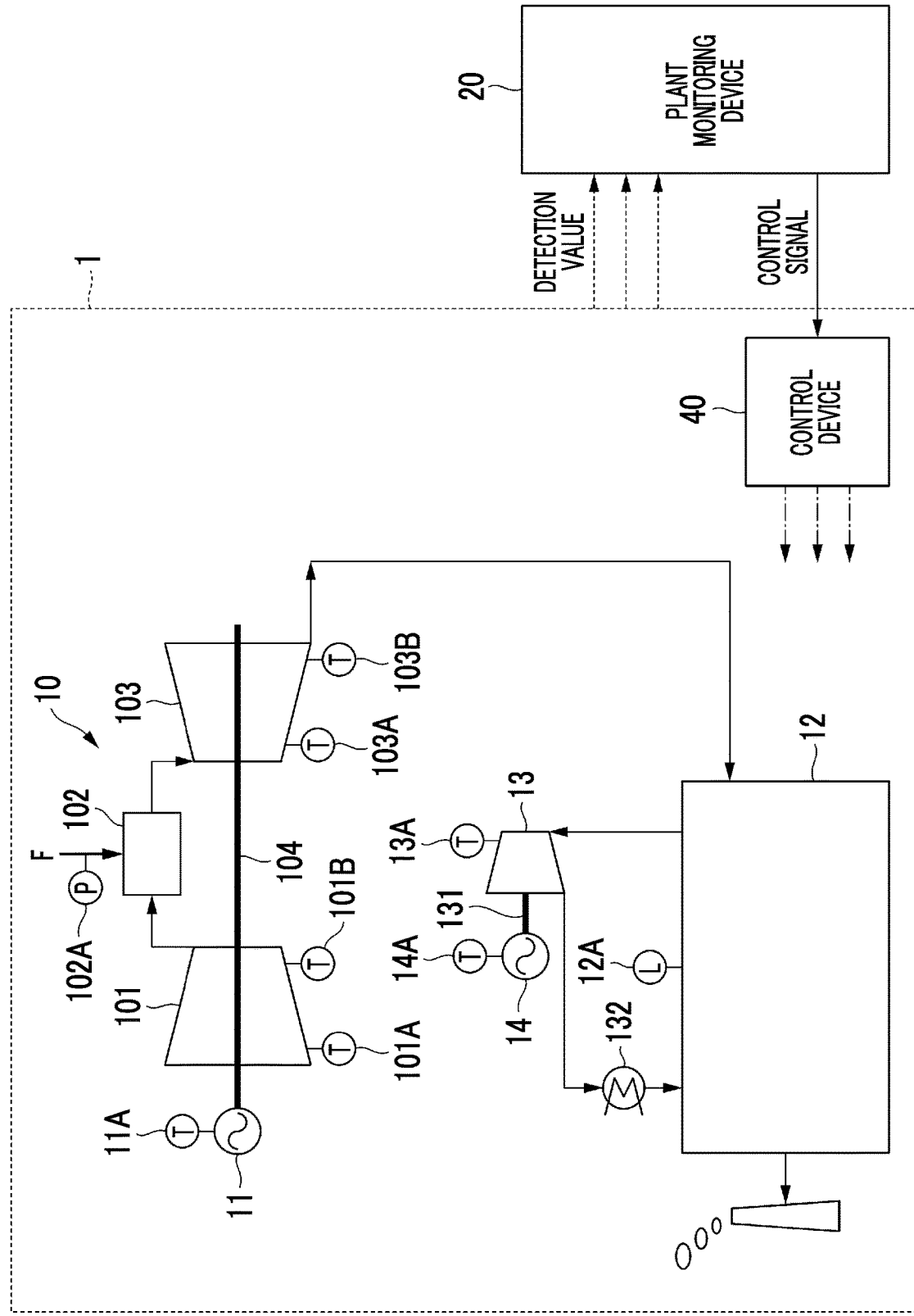
FIG. 1 is a diagram for describing an outline of a plant monitoring device according to a first embodiment of the present disclosure.

FIG. 1 is a diagram for describing an outline of the plant monitoring device according to the first embodiment of the present disclosure.

As shown in FIG. 1, the plant monitoring device 20 according to the present embodiment is a device for monitoring an operation state of a plant 1 which includes a plurality of evaluation items. The plant monitoring device 20 acquires a detection value indicating a state quantity for each evaluation item from a sensor provided in each part of the plant 1. The plant monitoring device 20 determines whether the operation state of the plant 1 is normal or abnormal based on the acquired detection value using the Mahalanobis Taguchi method (hereinafter, referred to as the MT method).

The plant 1 according to the present embodiment is a gas turbine combined power generation plant, and includes a gas turbine 10, a gas turbine generator 11, a heat recovery steam generator 12, a steam turbine 13, a steam turbine generator 14, and a control device 40. In another embodiment, the plant 1 may be a gas turbine power generation plant, a nuclear power generation plant, or a chemical plant.

The gas turbine 10 includes a compressor 101, a combustor 102, and a turbine 103.

The compressor 101 compresses air taken in from a suction port. The compressor 101 is provided with temperature sensors 101A and 101B as sensors for detecting a temperature in an interior chamber of the compressor 101, which is one of the evaluation items. For example, the temperature sensor 101A detects the temperature of an interior chamber inlet of the compressor 101 (inlet air temperature), and the temperature sensor 101B detects the temperature of an interior chamber outlet (outlet air temperature). In addition, the compressor 101 may further have a pressure sensor and a flow rate sensor.

The combustor 102 mixes a fuel F with the compressed air introduced from the compressor 101 to combust the mixture, and generates a combustion gas. The combustor 102 is provided with a pressure sensor 102A as a sensor for detecting the pressure of the fuel F, which is one of the evaluation items.

The turbine 103 is rotationally driven by the combustion gas supplied from the combustor 102. The turbine 103 is provided with temperature sensors 103A and 103B as sensors for detecting a temperature in the interior chamber, which is one of the evaluation items. For example, the temperature sensor 103A may detect the temperature of the interior chamber inlet of the turbine 103 (inlet combustion gas temperature), and the temperature sensor 103B may detect the temperature of the interior chamber outlet (outlet combustion gas temperature).

The gas turbine generator 11 is connected to a rotor 104 of the turbine 103 via the compressor 101, and generates power through the rotation of the rotor 104. The gas turbine generator 11 is provided with a thermometer 11A as a sensor for detecting the temperature of a lubricant, which is one of the evaluation items.

The heat recovery steam generator 12 heats water with a combustion gas (exhaust gas) exhausted from the turbine 103, and generates steam. The heat recovery steam generator 12 is provided with a level meter 12A as a sensor for detecting a water level of a drum, which is one of the evaluation items.

The steam turbine 13 is driven by the steam from the heat recovery steam generator 12. The steam turbine 13 is provided with a temperature sensor 13A as a sensor for detecting a temperature in the interior chamber, which is one of the evaluation items. In addition, the steam exhausted from the steam turbine 13 is converted back to water by a condenser 132, and is sent to the heat recovery steam generator 12 via a water supply pump.

The steam turbine generator 14 is connected to a rotor 131 of the steam turbine 13 and generates power through the rotation of the rotor 131. The steam turbine generator 14 is provided with a thermometer 14A as a sensor for detecting the temperature of a lubricant, which is one of the evaluation items.

The evaluation items described above are examples, and are not limited thereto. For example, an output of the gas turbine generator 11, a pressure in the interior chamber of the turbine 103, and the rotation speed and vibration of the rotor 104 may be set as other evaluation items of the plant 1. In this case, although not shown, a sensor that detects each of the state quantities of the evaluation items is provided in each part of the plant 1.

The control device 40 is a device for controlling an operation of the plant 1. In addition, in a case where the plant monitoring device 20 determines that the operation state of the plant 1 is abnormal, the control device 40 controls an operation of each part of the plant 1 in accordance with a control signal from the plant monitoring device 20.
(Functional Configuration of Plant Monitoring Device)

Figure 2:
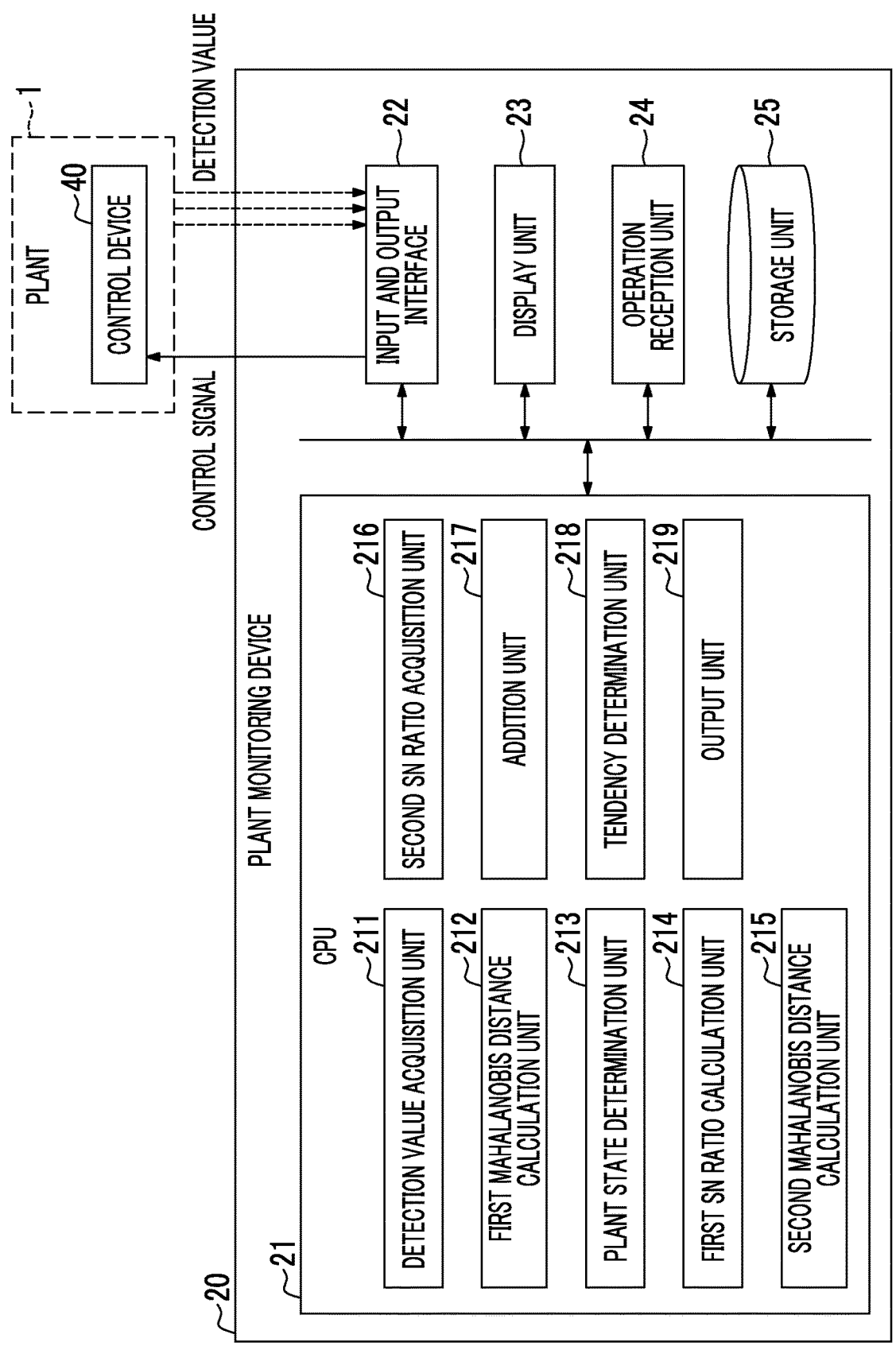
FIG. 2 is a diagram showing a functional configuration of the plant monitoring device according to the first embodiment of the present disclosure.

FIG. 2 is a diagram showing a functional configuration of the plant monitoring device according to the first embodiment of the present disclosure.

As shown in FIG. 2, the plant monitoring device 20 includes a CPU 21, an input and output interface 22, a display unit 23, an operation reception unit 24, and a storage unit 25.

The input and output interface 22 is connected to a detector of each part of the plant 1 and receives an input of a detection value for each of the plurality of evaluation items.

The display unit 23 is a display for displaying determination results of the operation state of the plant 1 from the plant monitoring device 20.

The operation reception unit 24 is a device such as a keyboard and a mouse for receiving operations from an operator who monitors the plant 1.

The CPU 21 is a processor that controls an operation of the entire plant monitoring device 20. The CPU 21 functions as a detection value acquisition unit 211, a first Mahalanobis distance calculation unit 212, a plant state determination unit 213, a first SN ratio calculation unit 214, a second Mahalanobis distance calculation unit 215, a second SN ratio acquisition unit 216, an addition unit 217, and a tendency determination unit 218 by executing various types of arithmetic processing in accordance with a program prepared in advance.

The detection value acquisition unit 211 acquires a bundle of detection values, which is a collection of detection values for each of the plurality of evaluation items, from the plant 1 via the input and output interface 22. The detection value acquisition unit 211 acquires a bundle of detection values for each predetermined time (for example, one minute), and stores and accumulates the bundle in the storage unit 25.

The first Mahalanobis distance calculation unit 212 calculates a Mahalanobis distance (hereinafter, also referred to as a "first Mahalanobis distance" or a "first MD") of a bundle of detection values with a unit space configured by a plurality of bundles of detection values, which are past operation data, as a reference.

The plant state determination unit 213 determines whether the operation state of the plant 1 is normal or abnormal based on whether or not the first Mahalanobis distance is equal to or smaller than a predetermined threshold value.

The first SN ratio calculation unit 214 calculates an SN ratio (hereinafter, also referred to as a "first SN ratio") for each of the plurality of evaluation items.

The second Mahalanobis distance calculation unit 215 increases or decreases each of a plurality of detection values to calculate a Mahalanobis distance (hereinafter, also referred to as a "second Mahalanobis distance" or a "second MD") corresponding to each of the increased or decreased detection values. In the present embodiment, the second Mahalanobis distance calculation unit 215 calculates a second Mahalanobis distance by increasing each of the detection values by a predetermined amount.

The second SN ratio acquisition unit 216 acquires a second SN ratio by performing conversion of a first SN ratio for each evaluation item based on the first Mahalanobis distance and the second Mahalanobis distance.

The addition unit 217 calculates an added value of a plurality of second SN ratios, which are acquired in a predetermined period, for each of the plurality of evaluation items.

The tendency determination unit 218 determines whether the detection values for each of the plurality of evaluation items tend to increase or tend to decrease based on the added value of the second SN ratios.

An output unit 219 creates operation state information of the plant 1 and outputs the operation state information to the display unit 23 for display. The output unit 219 creates, for example, operation state information including determination results from the plant state determination unit 213 (information indicating whether the operation state of the plant 1 is normal or abnormal). In addition, the output unit 219 may include, in the operation state information, information obtained by graphing transitions of a detection value, a first Mahalanobis distance, a first SN ratio, and a second SN ratio for each evaluation item until the present.

In addition, in a case where the operator performs an operation for remotely controlling the plant 1 via the operation reception unit 24, the output unit 219 may output a control signal corresponding to the operation to the control device 40 of the plant 1.

The storage unit 25 stores data acquired and generated in the processing of each part of the CPU 21.

(Processing Flow of Plant Monitoring Device)

Figure 3:
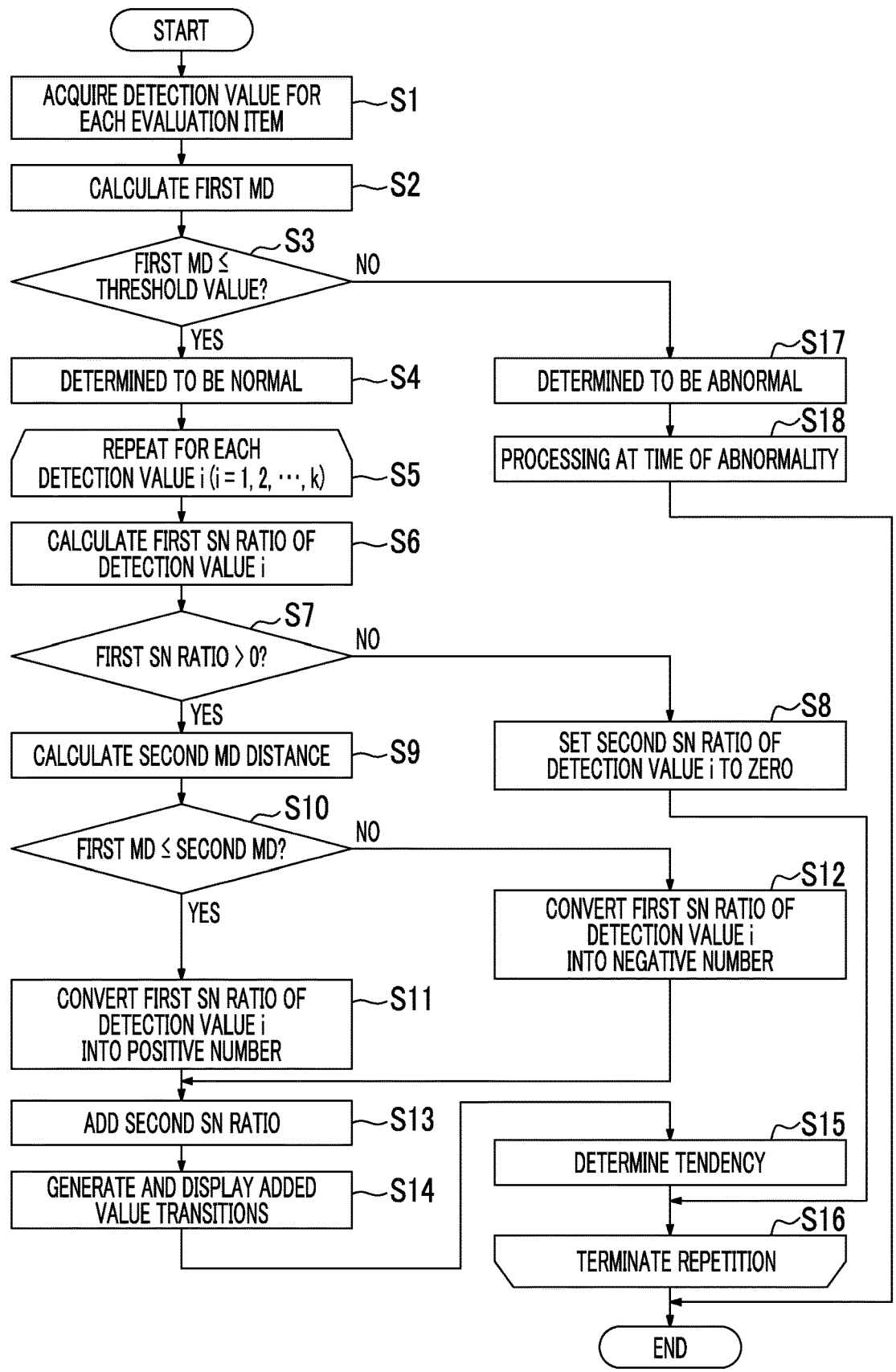
FIG. 3 is a first flowchart showing an example of processing of the plant monitoring device according to the first embodiment of the present disclosure.

FIG. 3 is a first flowchart showing an example of processing of the plant monitoring device according to the first embodiment of the present disclosure.

Hereinafter, an example of processing in which the plant monitoring device 20 monitors the presence or absence of an abnormality and a long-term tendency of the operation state of the plant 1 with a reference to FIG. 3.

First, the detection value acquisition unit 211 acquires a detection value for each of a plurality of evaluation items from a detector provided in each part of the plant 1 (Step S1). For example, in a case where the number of evaluation items is 100, the detection value acquisition unit 211 acquires 100 detection values corresponding to the respective evaluation items, and stores the detection values in the storage unit 25 as one bundle (a bundle of detection values).

Next, the first Mahalanobis distance calculation unit 212 calculates a first Mahalanobis distance (first MD) of the bundle of detection values acquired in Step S1 with the unit space as a reference (Step S2).

The unit space is an aggregate of data which is a reference when determining the operation state of the plant, and is generated from a collection of a bundle of detection values when the operation state of the plant 1 is normal. A collection period of the bundle of detection values for generating the unit space is a period past a time point when the operation state of the plant 1 is evaluated, and moves with the passage of time. In the present embodiment, the unit space is configured by a bundle of detection values collected in a period from the present to a predetermined time in the past. That is, in the bundle of detection values configuring the unit space, an old detection value is replaced with a new detection value with the passage of time. The unit space generated and updated in such a manner is stored in the storage unit 25. Accordingly, for example, a phenomenon in which fluctuations in the detection value, which are caused by aging and seasonal fluctuations, affect the Mahalanobis distance, and the plant state determination unit 213 mistakenly determines that the operation state is abnormal is suppressed.

In addition, the Mahalanobis distance is a distance that is weighted according to a variance and a correlation of the detection values for the unit space, and has a greater value as similarity with a data group for the unit space becomes lower. For example, an average of Mahalanobis distances of the bundle of detection values (data group at normal times) configuring the unit space is 1. In addition, in a case where the operation state of the plant 1 is normal, the first Mahalanobis distance of the bundle of detection values acquired in Step S1 is generally 4 or less. However, when the operation state of the plant 1 is abnormal, the first Mahalanobis distance increases according to the degree of the abnormality.

Next, the plant state determination unit 213 determines whether or not the first Mahalanobis distance calculated in Step S2 is equal to or smaller than a threshold value (Step S3). A value set in advance according to the characteristics of the plant 1 is stored in the storage unit 25 as the threshold value. In addition, the plant monitoring device 20 may receive a change in the threshold value from the operator via the operation reception unit 24.

In a case where the first Mahalanobis distance is equal to or smaller than the threshold value (Step S3: YES), the plant state determination unit 213 determines that the operation state of the plant 1 is normal (Step S4). At this time, the output unit 219 may cause the display unit 23 to display operation state information including the determination result showing that the operation state of the plant 1 is normal.

In addition, in a case where the operation state of the plant 1 is determined to be normal, the plant monitoring device 20 executes a series of processing steps for monitoring a long-term tendency of each of the evaluation items. For example, in a case where there are k evaluation items, the following processing is repeatedly executed for each detection value i (i=1, 2, . . . , k) corresponding to each of evaluation items 1 to k acquired in Step S1 (Step S5).

First, the first SN ratio calculation unit 214 calculates a first SN ratio, which is a desired SN ratio of the detection value i (Step S6). Since a method of calculating an SN ratio is known, description thereof will be omitted.

Next, the second Mahalanobis distance calculation unit 215 determines whether or not the first SN ratio of the detection value i is a positive number (a value greater than "0") (Step S7).

In a case where the first SN ratio of the detection value i is not a positive number (is "0" or a negative number), the second Mahalanobis distance calculation unit 215 does not calculate a second Mahalanobis distance. In addition, in this case, the second SN ratio acquisition unit 216 sets a second SN ratio of the detection value i to "0" (Step S8). In addition, the second SN ratio is stored and accumulated in the storage unit 25. Then, the plant monitoring device 20 terminates long-term tendency monitoring processing for the detection value i, and proceeds to Step S16.

On the other hand, in a case where the first SN ratio of the detection value i is a positive number, the second Mahalanobis distance calculation unit 215 calculates a second Mahalanobis distance (second MD) of the detection value i (Step S9). Specifically, the second Mahalanobis distance calculation unit 215 increases the detection value i by a predetermined amount and calculates the second Mahalanobis distance corresponding to the increased detection value i. At this time, the second Mahalanobis distance calculation unit 215 may set a predetermined amount for each evaluation item based on the bundle of detection values configuring the unit space. For example, the second Mahalanobis distance calculation unit 215 extracts a detection value of the same evaluation item as the detection value i from the unit space and calculates a standard deviation thereof. Then, the second Mahalanobis distance calculation unit 215 sets a value (+0.0001σ to +0.5σ) which is $1/10,000$ to $5/10$ of the standard deviation as a predetermined amount to be added to the detection value i. The predetermined amount is more preferably a value (+0.001σ to +0.1σ) which is $1/1,000$ to $1/10$ of the standard deviation, and is most preferably a value (+0.01σ to +0.1σ) which is $1/100$ to $1/10$ of the standard deviation.

Next, the second SN ratio acquisition unit 216 determines whether the second Mahalanobis distance is equal to or greater than the first Mahalanobis distance (Step S10).

In a case where the second Mahalanobis distance is equal to or greater than the first Mahalanobis distance (Step S10: YES), the second SN ratio acquisition unit 216 determines that the detection value i tends to be "high" in relation to other detection values. For this reason, the second SN ratio acquisition unit 216 acquires a value obtained by converting the first SN ratio of the detection value i into a "positive number" as the second SN ratio of the detection value i (Step S11). In addition, the second SN ratio is stored and accumulated in the storage unit 25.

On the other hand, in a case where the second Mahalanobis distance is less than the first Mahalanobis distance (Step S10: NO), the second SN ratio acquisition unit 216 determines that the detection value i tends to be "low" in relation to other detection values. For this reason, the second SN ratio acquisition unit 216 acquires a value obtained by converting the first SN ratio of the detection value i into a "negative number" as the second SN ratio of the detection value i (Step S12). In addition, the second SN ratio is stored and accumulated in the storage unit 25.

Next, the addition unit 217 adds the second SN ratio of the detection value i accumulated in the storage unit 25 (Step S13). That is, the addition unit 217 adds all of the second SN ratios of the detection values i calculated from first start of the plant 1 to the present.

In addition, the output unit 219 generates a graph (FIG. 5) representing added value transitions, in which added values calculated until the present are arranged in time series, and causes the display unit 23 to display the graph as operation state information (Step S14).

Figure 4:
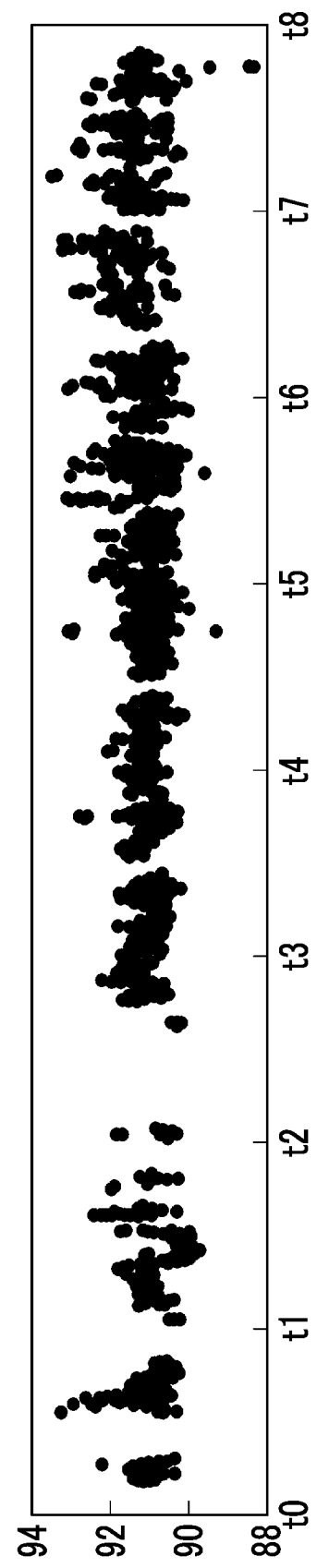
FIG. 4 is a graph showing an example of a detection value according to the first embodiment of the present disclosure.

FIG. 4 is a graph showing an example of the detection value according to the first embodiment of the present disclosure.

For example, the detection value i is a detection value of a compressor efficiency of the compressor 101. In this case, as shown in FIG. 4, the detection value acquisition unit 211 acquires and accumulates the detection value of the compressor efficiency at each time point from a time (t0) when the plant 1 is first started to the present (t8). The detection value acquisition unit 211 may calculate and acquire a compressor efficiency from each of detection values from temperature, pressure, and flow rate sensors provided at the compressor 101. The detection value of each evaluation item fluctuates depending on effects of specifications of the plant 1, operation conditions, and sensor types. For this reason, even when the operator of the plant 1 confirms a time-series change in the detection value (raw data) of the compressor efficiency shown in FIG. 4, it is difficult to learn a long-term tendency of the compressor efficiency.

In addition, for example, slight damage to the compressor does not have a great effect immediately, but the compressor efficiency gradually decreases in the long term in some cases. At this time, since the value of the compressor efficiency included in the unit space is replaced with the passage of time, the unit space also moves gradually in accordance with a tendency for the compressor efficiency decrease. Then, the value of the compressor efficiency tends to decrease in the long term, but there is a possibility that the tendency is difficult to be reflected in the Mahalanobis distance as the unit space is updated. For this reason, in a system of the related art, in which the Mahalanobis Taguchi method (MT method) is used, it is difficult to detect an abnormality from a detection value that gradually decreases or increases in the long term.

Figure 5:
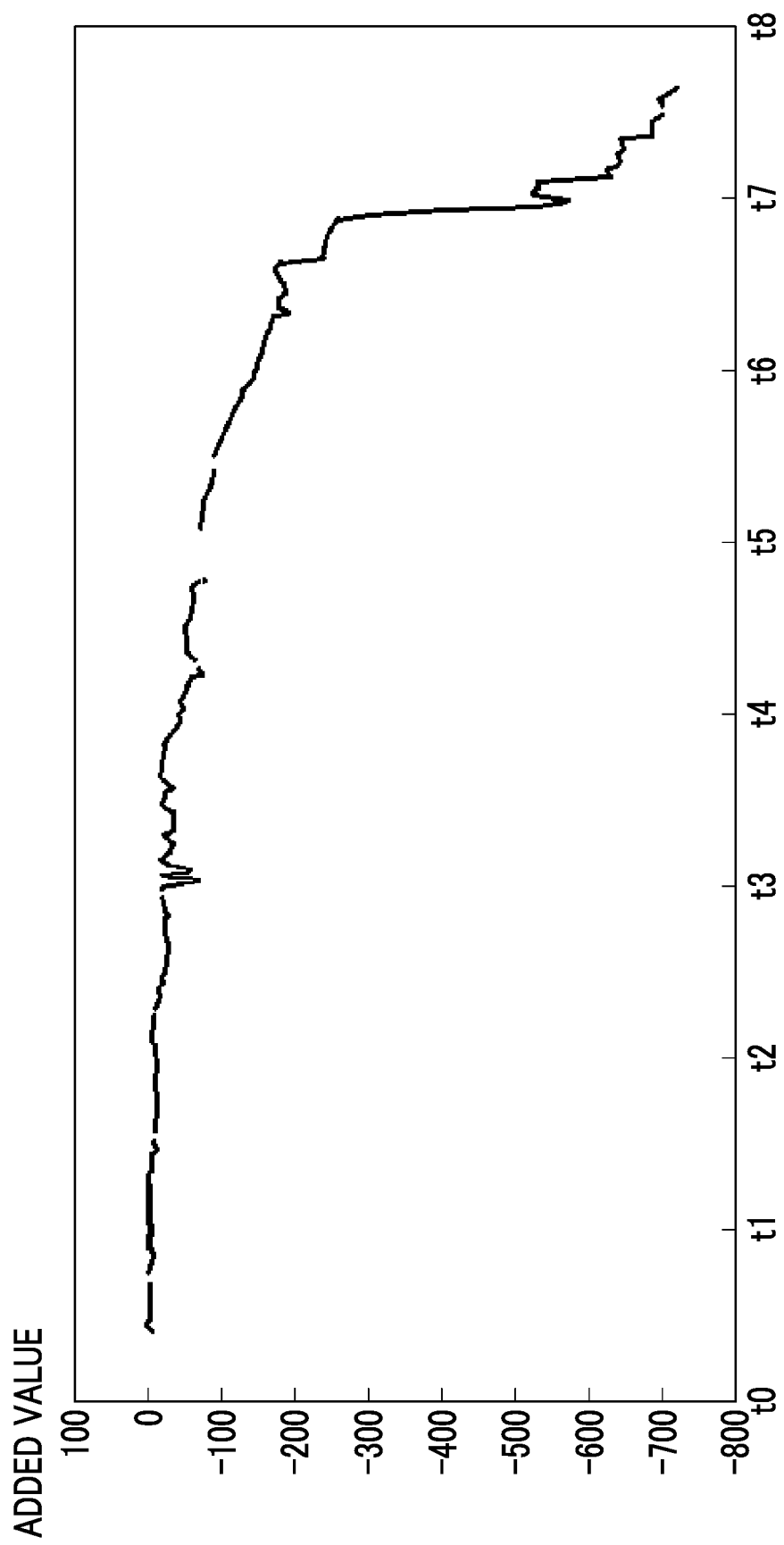
FIG. 5 is a graph showing an example of added value transitions of a second SN ratio according to the first embodiment of the present disclosure.

FIG. 5 is a graph showing an example of added value transitions of the second SN ratio according to the first embodiment of the present disclosure.

Based on the description above, the addition unit 217 according to the present embodiment calculates an added value of second SN ratios of past compressor efficiencies each time the detection value acquisition unit 211 acquires the detection value (FIG. 4) of the compressor efficiency and accumulates the added value in the storage unit 25. In addition, the output unit 219 causes the display unit 23 to display the added value transitions of the compressor efficiency shown in FIG. 5 in Step S14. From the added value transitions shown in FIG. 5, it can be confirmed that the added value of second SN ratios tends to decrease with the passage of time. That is, the operator of the plant 1 can easily learn that the compressor efficiency tends to decrease in the long term from the added value transitions displayed on the display unit 23. Accordingly, even in a case where the first Mahalanobis distance is less than the threshold value in Steps S3 to S4 and the operation state of the plant 1 is determined to be normal, the operator can easily learn that the plant 1 is gradually approaching an abnormal state by confirming the long-term tendency of each evaluation item of the plant 1.

The long-term tendency of each evaluation item may be determined by the tendency determination unit 218 of the plant monitoring device 20 instead of by the operator (Step S15).

Figure 6:
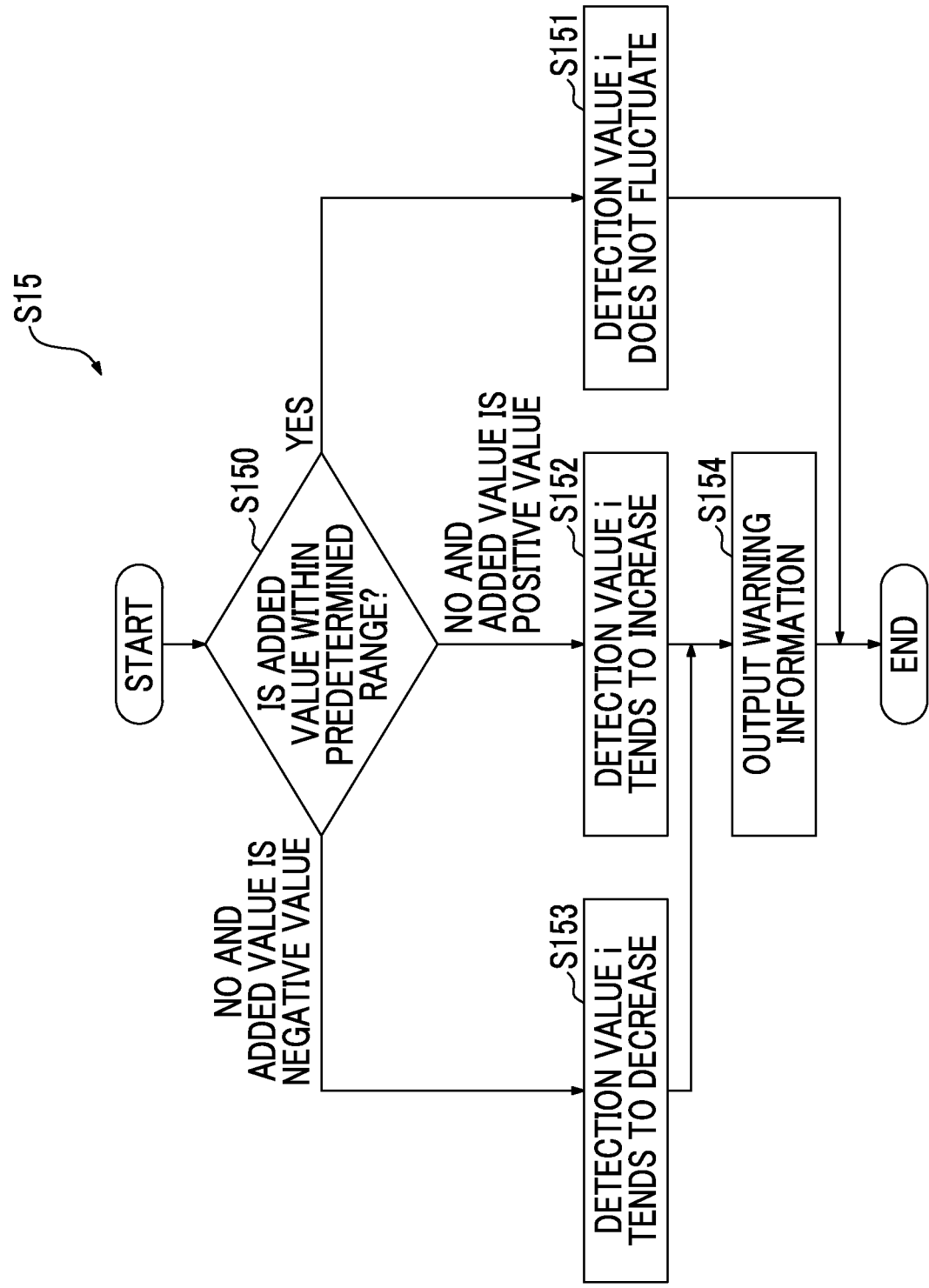
FIG. 6 is a second flowchart showing an example of the processing of the plant monitoring device according to the first embodiment of the present disclosure.

FIG. 6 is a second flowchart showing an example of processing of the plant monitoring device according to the first embodiment of the present disclosure.

As shown in FIG. 6, first, the tendency determination unit 218 determines whether or not the added value calculated in Step S13 of FIG. 3 is within a predetermined range (for example, within ±100) (Step S150). The predetermined range may be set by the operator to any value through the operation reception unit 24.

For example, in a case where the added value is within the predetermined range (Step S150: YES), the tendency determination unit 218 determines that the detection value i does not fluctuate significantly in the long term (Step S151). That is, the tendency determination unit 218 determines that it has not been detected that the detection value i tends to increase or tends to decrease.

On the other hand, in a case where the added value exceeds the predetermined range (Step S150: NO) and is a positive number, the tendency determination unit 218 determines that the detection value i tends to increase in the long term (Step S152).

In addition, in a case where the added value exceeds the predetermined range (Step S150: NO) and is a negative number, the tendency determination unit 218 determines that the detection value i tends to decrease in the long term (Step S153).

In addition, in a case where the added value exceeds the predetermined range (Step S150: NO), the output unit 219 outputs the determination result (whether the detection value i tends to increase or tends to decrease) from the tendency determination unit 218 and warning information including information that can identify an evaluation item (an evaluation item name or an identification number) (Step S154). At this time, the output unit 219 may cause the display unit 23 to display the warning information or may transmit the warning information to a terminal device of the operator via e-mail. Accordingly, the output unit 219 can promptly and easily make the operator recognize how the long-term tendency of any evaluation item has changed.

Next, with reference back to FIG. 3, when processing of Steps S6 to S16 is completed on all of the evaluation items 1 to k, the plant monitoring device 20 terminates a series of monitoring processing steps (Step S16).

In addition, in a case where the first Mahalanobis distance exceeds the threshold value (Step S3: NO), the plant state determination unit 213 determines that the operation state of the plant 1 is abnormal (Step S17). At this time, the plant monitoring device 20 executes processing at the time of an abnormality of the plant 1 (Step S18). The content of the processing at the time of an abnormality is the same as in the system of the related art. For example, the first SN ratio calculation unit 214 calculates a desired SN ratio for each evaluation item and estimates a detection value, which is a cause affecting an increase in the Mahalanobis distance, from a difference in a desired SN ratio of the presence or absence of the item based on the orthogonal array analysis. The output unit 219 causes the display unit 23 to display an evaluation item name of the detection value, which is a cause estimated by the first SN ratio calculation unit 214, and an SN ratio as operation state information. The output unit 219 receives an operation by the operator of the plant 1 through the operation reception unit 24 and outputs a control signal to the control device 40 of the plant 1. In addition, the output unit 219 may automatically output a control signal of stopping the plant 1 to the control device 40 of the plant 1.

(Operational Effects)

As described above, the plant monitoring device 20 according to the present embodiment acquires a second SN ratio obtained by converting a first SN ratio of each evaluation item based on a first Mahalanobis distance calculated based on a detection value of each evaluation item and a second Mahalanobis distance calculated by changing each detection value, and calculates an added value of the second SN ratios for each of the evaluation items.

By doing so, the plant monitoring device 20 can easily make the operator learn a long-term tendency for each evaluation item through the added value of second SN ratios. In addition, since the plant monitoring device 20 can show the long-term tendency of each of all the evaluation items through the added value of second SN ratios regardless of specifications of the plant 1, operation conditions, sensor types, and content of an evaluation item, versatility and generality can be improved.

In addition, the plant monitoring device 20 determines whether the operation state of the plant 1 is normal or abnormal based on whether or not the first Mahalanobis distance is equal to or smaller than a predetermined threshold value. In a case where the first Mahalanobis distance is less than the predetermined threshold value and the operation state of the plant 1 is determined to be normal, the plant monitoring device 20 further acquires a first SN ratio, a second Mahalanobis distance, and a second SN ratio and monitors a long-term tendency for each evaluation item of the plant 1.

Accordingly, the plant monitoring device 20 can simultaneously monitor both of an abnormality of the operation state of the plant 1 and the long-term tendency of the plant 1.

In addition, the plant monitoring device 20 determines whether the detection value for each evaluation item tends to increase or tends to decrease based on the added value of second SN ratios.

By doing so, it is possible for the plant monitoring device 20 to automatically diagnose the long-term tendency of the plant 1 without the operator sequentially monitoring the added value of second SN ratios. Further, the plant monitoring device 20 may output determination results of the long-term tendency. Accordingly, the plant monitoring device 20 can promptly and easily make the operator recognize how the long-term tendency for each evaluation item has changed.

In addition, in a case where an added value of second SN ratios of one evaluation item exceeds a predetermined range, the plant monitoring device 20 determines that a detection value of the evaluation item tends to increase when the added value of second SN ratios is a positive number and determines that the detection value of the evaluation item tends to decrease when the added value of second SN ratios is a negative number.

By doing so, since the plant monitoring device 20 can automatically determine the long-term tendency of the detection value of each evaluation item, a monitoring load on the operator can be reduced.

In addition, the plant monitoring device 20 calculates a second Mahalanobis distance by increasing each detection value by a predetermined amount and acquires a second SN ratio by converting the first SN ratio into a positive number or a negative number based on whether the second Mahalanobis distance is equal to or greater than the first Mahalanobis distance.

By doing so, the plant monitoring device 20 can determine whether or not the detection value tends to be high also in relation to other detection values according to whether or not the second Mahalanobis distance increases and can reflect the tendency in the second SN ratio.

In addition, in a case where the first SN ratio is a negative number, the plant monitoring device 20 sets the second SN ratio to zero.

In a case where the first SN ratio of one evaluation item is a negative number, it can be determined that an effect of the detection value of the evaluation item on increasing the first Mahalanobis distance is negligibly small. For this reason, as the plant monitoring device 20 treats the second SN ratio of such an evaluation item of which the effect is as small as zero, processing can be simplified. In addition, accordingly, for the detection value of the evaluation item that affects the first Mahalanobis distance, the plant monitoring device 20 can divide the second SN ratio into a positive number or a negative number according to a relative level with respect to detection values of other evaluation items. As a result, the plant monitoring device 20 can provide the operator with data that makes it easy to intuitively understand whether the detection value tends to increase or tends to decrease based on whether the added value is a positive number or is a negative number.

Second Embodiment

Next, the plant monitoring device 20 according to a second embodiment of the present disclosure will be described with a reference to FIG. 7.

Components common to the first embodiment will be assigned with the same a reference numerals, and detailed description thereof will be omitted. In the present embodiment, processing of the tendency determination unit 218 of the plant monitoring device 20 is different from the first embodiment.

(Processing Flow of Plant Monitoring Device)

Figure 7:
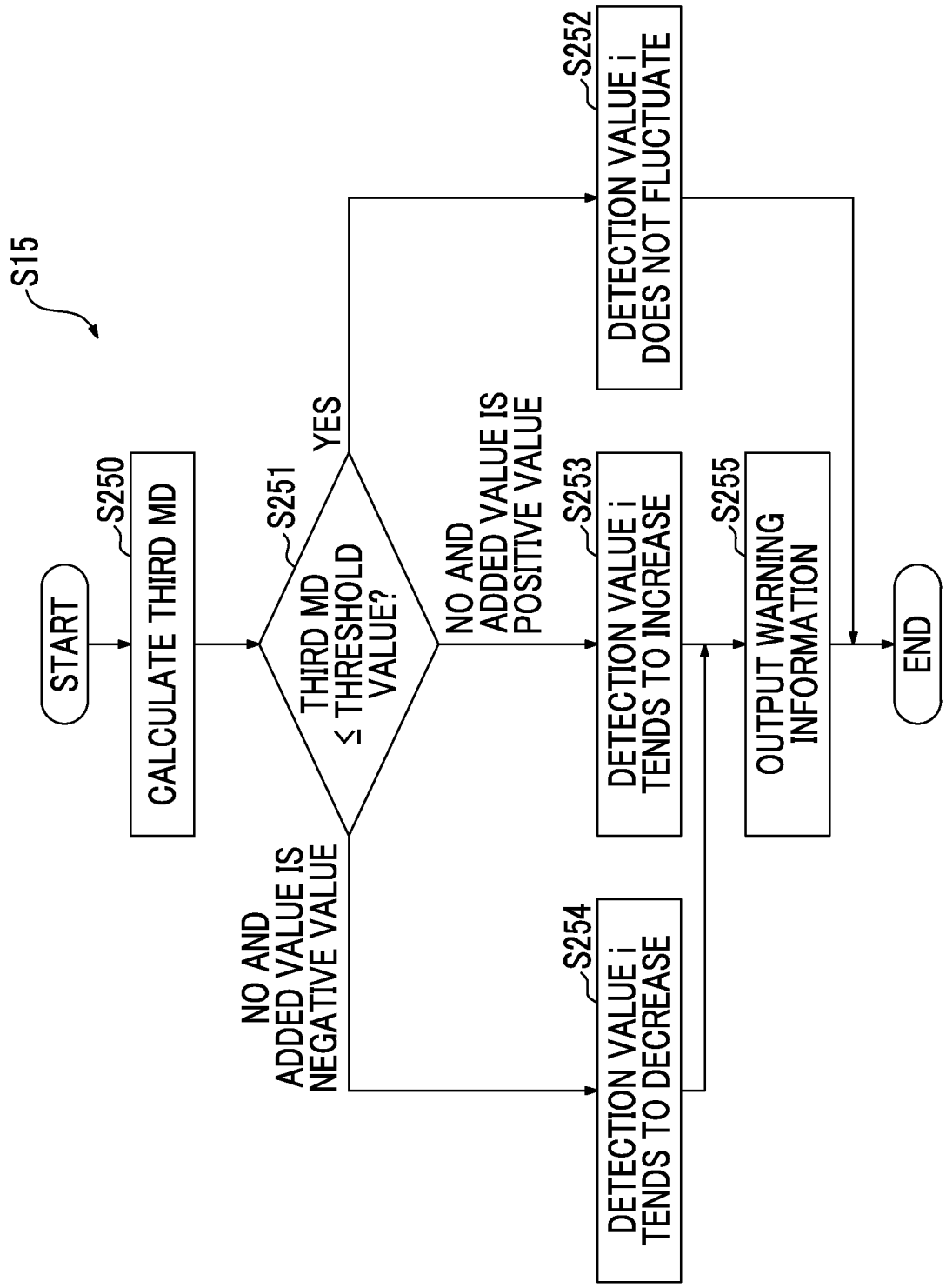
FIG. 7 is a flowchart showing an example of processing of a plant monitoring device according to a second embodiment of the present disclosure.

FIG. 7 is a flowchart showing an example of processing of the plant monitoring device according to a modification example of the first embodiment of the present disclosure.

In Step S15 of FIG. 3, the tendency determination unit 218 according to the present embodiment executes a series of processing steps shown in FIG. 7 instead of a series of processing steps shown in FIG. 6.

In the present embodiment, the tendency determination unit 218 treats an added value of second SN ratios of the detection value i calculated in Step S13 of FIG. 3 as one detection value. Specifically, as shown in FIG. 7, the tendency determination unit 218 calculates a third Mahalanobis distance (third MD) of the added value (Step S250). In the present embodiment, the tendency determination unit 218 generates, for each predetermined time, a unit space of an added value of a plurality of second SN ratios calculated in a period from the present to a predetermined time in the past. The tendency determination unit 218 calculates the third Mahalanobis distance of the added value calculated in Step S13 of FIG. 3 with the unit space of the added value as a reference. In addition to the added value of the second SN ratios, the tendency determination unit 218 may generate a unit space including a bundle of a plurality of detection values collected in a period from the present to a predetermined time in the past and calculate a third Mahalanobis distance of the bundle of detection values configured by the plurality of detection values (detection value 1 to detection value k) acquired in S1 of FIG. 3 and the added value (detection value k+1) calculated in Step S13.

Next, the tendency determination unit 218 determines whether or not the third Mahalanobis distance is equal to or smaller than a threshold value (Step S251). A value set in advance according to the characteristics of the plant 1 is stored in the storage unit 25 as the threshold value. In addition, the plant monitoring device 20 may receive a change in the threshold value from the operator via the operation reception unit 24.

In a case where the third Mahalanobis distance is equal to or smaller than the threshold value (Step S251: YES), the tendency determination unit 218 determines that the detection value i does not fluctuate significantly in the long term (Step S252). That is, the tendency determination unit 218 determines that it has not been detected that the detection value i tends to increase or tends to decrease.

On the other hand, in a case where the third Mahalanobis distance exceeds the threshold value (Step S251: NO) and the added value is a positive number, the tendency determination unit 218 determines that the detection value i tends to increase in the long term (Step S253).

In addition, in a case where the third Mahalanobis distance exceeds the threshold value (Step S251: NO) and the added value is a negative number, the tendency determination unit 218 determines that the detection value i tends to decrease in the long term (Step S254).

In addition, in a case where the third Mahalanobis distance exceeds the threshold value (Step S251: NO), the output unit 219 outputs the determination result (whether the detection value i tends to increase or tends to decrease) from the tendency determination unit 218 and warning information including information that can identify an evaluation item (an evaluation item name or an identification number) (Step S255). The processing is the same as in Step S154 of FIG. 6.

(Operational Effects)

As described above, in a case where the third Mahalanobis distance of the added value of second SN ratios of one evaluation item exceeds the predetermined threshold value, the plant monitoring device 20 according to the present embodiment determines that the detection value of the evaluation item tends to increase when the added value of second SN ratios is a positive number and determines that the detection value of the evaluation item tends to decrease when the added value of second SN ratios is a negative number.

By doing so, since the plant monitoring device 20 can automatically determine the presence or absence of a change in the long-term tendency based on the third Mahalanobis distance, a monitoring load on the operator can be reduced. In addition, the plant monitoring device 20 can determine the presence or absence of a change in the long-term tendency using a general threshold value (for example, 4) of the Mahalanobis distance. Accordingly, since it is not necessary for the operator to adjust the threshold value for each evaluation item, the versatility and generality of the plant monitoring device 20 can be further improved.

(Hardware Configuration)

Figure 8:
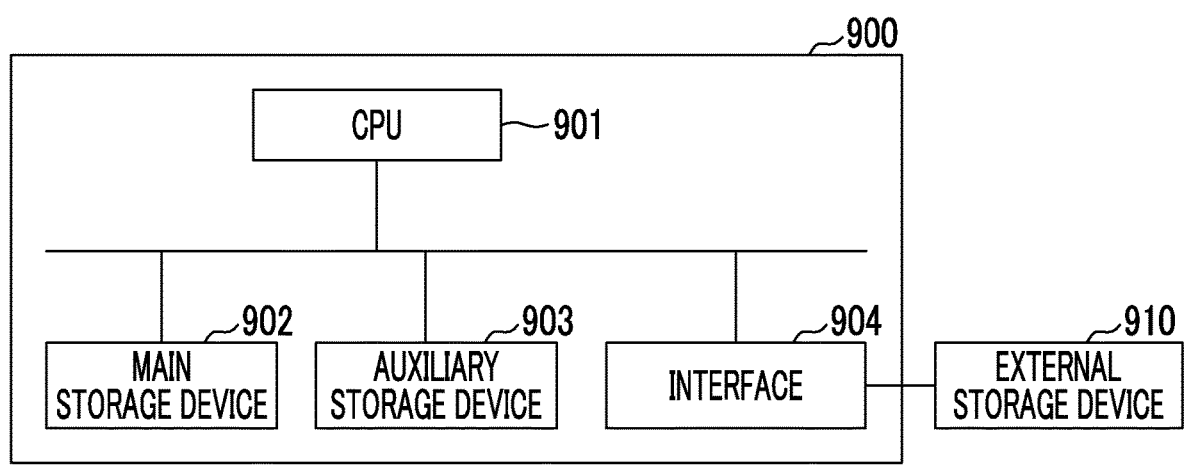
FIG. 8 is a diagram showing an example of a hardware configuration of the plant monitoring device according to at least one embodiment of the present disclosure.

FIG. 8 is a diagram showing an example of a hardware configuration of the plant monitoring device according to at least one embodiment of the present disclosure.

Hereinafter, the hardware configuration of the plant monitoring device 20 according to the present embodiment will be described with a reference to FIG. 8.

A computer 900 includes a processor 901, a main storage device 902, an auxiliary storage device 903, and an interface 904.

The plant monitoring device 20 described above is mounted on one or a plurality of computers 900. Then, an operation of each functional unit described above is stored in a form of a program in the auxiliary storage device 903. The processor 901 reads the program from the auxiliary storage device 903, deploys the program in the main storage device 902, and executes the processing in accordance with the program. In addition, the processor 901 secures a storage area, which corresponds to each storage unit described above, in the main storage device 902 in accordance with the program. Examples of the processor 901 include a central processing unit (CPU), a graphic processing unit (GPU), and a microprocessor.

The program may be a program for realizing some of the functions fulfilled by the computer 900. For example, the program may be a program that fulfills the functions in combination with other programs already stored in the auxiliary storage device 903 or in combination with other programs installed in other devices. In another embodiment, the computer 900 may include a custom large scale integrated circuit (LSI) such as a programmable logic device (PLD), in addition to the configuration or instead of the configuration. Examples of the PLD include a programmable array logic (PAL), a generic array logic (GAL), a complex programmable logic device (CPLD), and a field programmable gate array (FPGA). In this case, some or all of the functions realized by the processor 901 may be realized by the integrated circuit. Such an integrated circuit is also included in an example of the processor.

Examples of the auxiliary storage device 903 include a hard disk drive (HDD), a solid state drive (SSD), a magnetic disk, a magneto-optical disk, a compact disc read only memory (CD-ROM), a digital versatile disc read only memory (DVD-ROM), and a semiconductor memory. The auxiliary storage device 903 may be an internal medium directly connected to a bus of the computer 900, or may be an external storage device 910 connected to the computer 900 via the interface 904 or a communication line. In addition, in a case where the program is distributed to the computer 900 via the communication line, the computer 900 that has received the distribution may deploy the program in the main storage device 902 and execute the processing. In at least one embodiment, the auxiliary storage device 903 is a non-transitory tangible storage medium.

In addition, the program may be a program for realizing some of the functions described above. Further, the program may be a program that realizes the functions described above in combination with other programs already stored in the auxiliary storage device 903, that is, a so-called difference file (difference program).

Although the embodiments of the present invention have been described in detail hereinbefore, the present invention is not limited thereto and can undergo some design changes without departing from the technical gist of the present invention.

First Modification Example (Processing Flow of Plant Monitoring Device)

Figure 9:
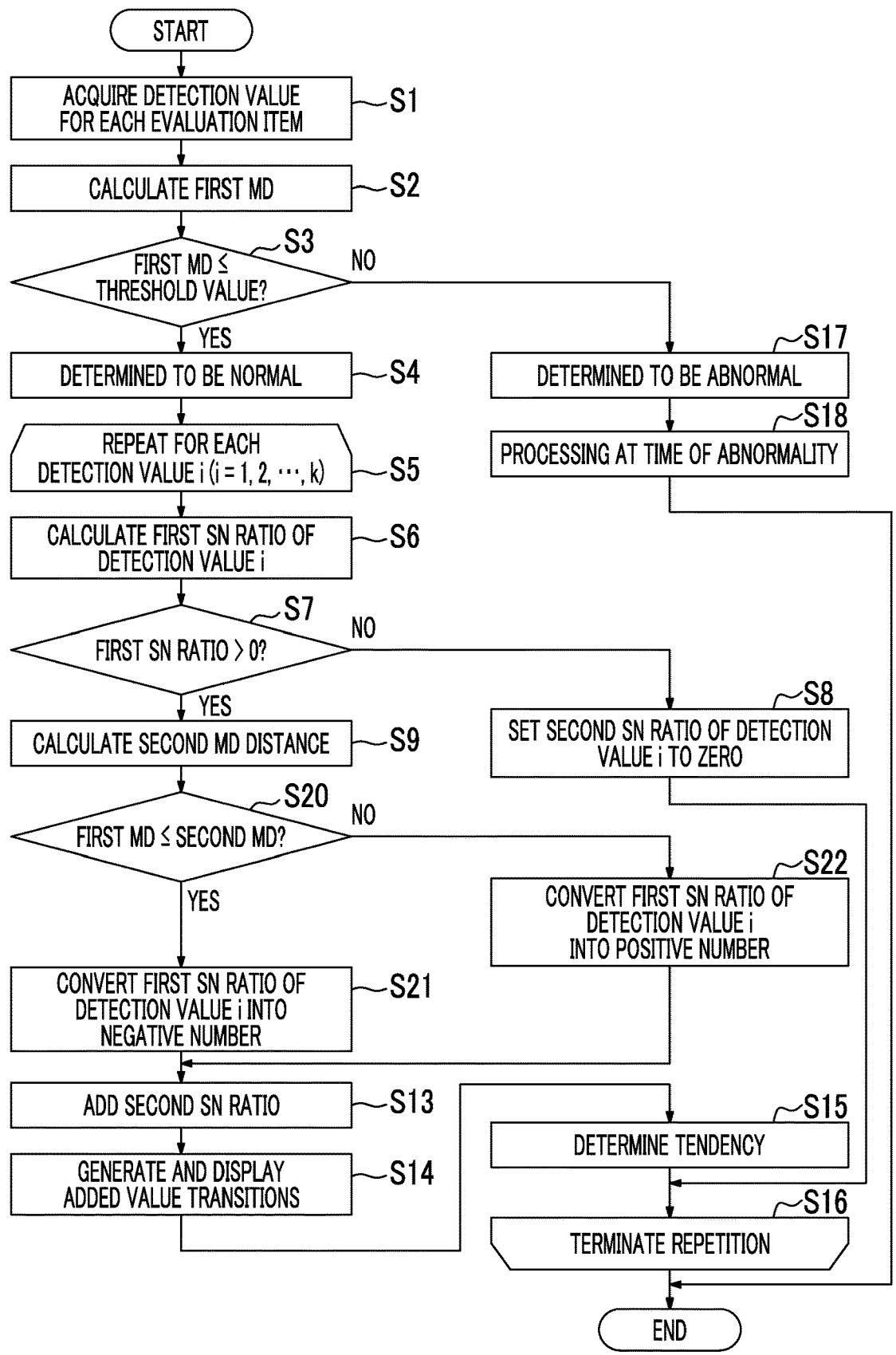
FIG. 9 is a flowchart showing an example of processing of a plant monitoring device according to a first modification example of the present disclosure.

FIG. 9 is a flowchart showing an example of processing of the plant monitoring device according to a first modification example of the present disclosure.

Although an aspect in which the second Mahalanobis distance calculation unit 215 calculates a second Mahalanobis distance by increasing the detection value i by a predetermined amount has been described in the first and second embodiments described above, the present invention is not limited thereto. For example, the second Mahalanobis distance calculation unit 215 according to the first modification example may calculate a second Mahalanobis distance by decreasing the detection value i by a predetermined amount in Step S9 of FIG. 3. In this case, the second Mahalanobis distance calculation unit 215 calculates the predetermined amount as in each of the embodiments described above. Specifically, the second Mahalanobis distance calculation unit 215 extracts a detection value of the same evaluation item as the detection value i from the unit space and calculates a standard deviation thereof. Then, the second Mahalanobis distance calculation unit 215 sets a value (+0.0001σ to +0.5σ) which is $1/10{,}000$ to $5/10$ of the standard deviation as a predetermined amount to be subtracted from the detection value i. The predetermined amount is more preferably a value (+0.001σ to +0.1σ) which is $1/1{,}000$ to $1/10$ of the standard deviation, and is most preferably a value (+0.01σ to +0.1σ) which is $1/100$ to $1/10$ of the standard deviation.

In addition, the second SN ratio acquisition unit 216 according to the present modification example executes Steps S20 to S21 of FIG. 9, instead of Steps S10 to S12 of FIG. 3.

Specifically, as shown in FIG. 9, in a case where the second Mahalanobis distance is equal to or greater than the first Mahalanobis distance (Step S20: YES), the second SN ratio acquisition unit 216 determines that the detection value i tends to be "low" in relation to other detection values. For this reason, the second SN ratio acquisition unit 216 acquires a value obtained by converting the first SN ratio of the detection value i into a "negative number" as the second SN ratio of the detection value i (Step S21). In addition, the second SN ratio is stored and accumulated in the storage unit 25.

On the other hand, in a case where the second Mahalanobis distance is less than the first Mahalanobis distance (Step S20: NO), the second SN ratio acquisition unit 216 determines that the detection value i tends to be "high" in relation to other detection values. For this reason, the second SN ratio acquisition unit 216 acquires a value obtained by converting the first SN ratio of the detection value i into a "positive number" as the second SN ratio of the detection value i (Step S22). In addition, the second SN ratio is stored and accumulated in the storage unit 25.

Subsequent processing is the same as in the first and second embodiments.

(Operational Effects)

As described above, the plant monitoring device 20 according to the present modification example calculates a second Mahalanobis distance by decreasing each detection value by a predetermined amount and acquires a second SN ratio by converting the first SN ratio into a negative number or a positive number based on whether the second Mahalanobis distance is equal to or greater than the first Mahalanobis distance.

By doing so, the plant monitoring device 20 can determine whether or not the detection value tends to be high also in relation to other detection values according to whether or not the second Mahalanobis distance decreases and can reflect the tendency in the second SN ratio.

Second Modification Example (Processing Flow of Plant Monitoring Device)

FIG. 10 is a flowchart showing an example of processing of the plant monitoring device according to a second modification example of the present disclosure.

Although an aspect in which the tendency determination unit 218 treats an added value of second SN ratios as one detection value and calculates a third Mahalanobis distance has been described in the second embodiment described above, the present invention is not limited thereto. For example, the tendency determination unit 218 according to the second modification example may execute the processing shown in FIG. 10 instead of the processing of Steps S14 and S15 of FIG. 3.

Each second SN ratio calculated by acquiring a bundle of detection values for each predetermined time (for example, 1 minute) and executing processing of Steps S2 to S12 of FIG. 3 includes an error. Accordingly, an added value of second SN ratios also includes an error. When the number of pieces of data n (the number of second SN ratios for the detection value i acquired until the present) added by the addition unit 217 increases assuming that each of errors δsn of the second SN ratios are the same, the error of the added value of second SN ratios is "δsn×√n", and increases √n times. That is, the error of the added value of second SN ratios increases 10 times when the number of pieces of data n to be added is 100, and increases 100 times when the number is 10,000. Therefore, when a second SN ratio for each predetermined time (for example, 1 minute) in a long period of time (for example, for 6 months) is calculated and added, an added value of second SN ratios includes a large error that is not negligible. Since an increase in an added value error is known as the addition of the error propagation rule, description thereof will be omitted.

Based on the fact that a second SN ratio includes an error as described above, the plant monitoring device 20 according to the present modification example executes Step S240 of FIG. 10 instead of Step S14 of FIG. 3. Herein, the tendency determination unit 218 calculates a corrected added value obtained by dividing the added value of second SN ratios of the number of pieces of data n by √n to correct an error. Then, the output unit 219 generates the graph (FIG. 5), in which the corrected added values are arranged in time series, and causes the display unit 23 to display the graph as operation state information (Step S240).

Next, the tendency determination unit 218 treats the corrected added value of second SN ratios as one detection value and calculates a third Mahalanobis distance (third MD) (Step S250). Specifically, as in the second embodiment, the tendency determination unit 218 generates, for each predetermined time, a unit space of a corrected added value of second SN ratios calculated in a period from the present to a predetermined time in the past. The tendency determination unit 218 calculates the third Mahalanobis distance of the corrected added value of second SN ratios calculated in Step S240 of FIG. 10 with the unit space of the corrected added value of second SN ratios as a reference. In addition to the corrected added value of the second SN ratios, the tendency determination unit 218 may generate a unit space including a bundle of a plurality of detection values collected in a period from the present to a predetermined time in the past and calculate a third Mahalanobis distance of the bundle of detection values configured by the plurality of detection values (the detection value 1 to the detection value k) acquired in S1 of FIG. 3 and the added value (detection value k+1) calculated in Step S240 of FIG. 10.

Subsequent processing of Steps S251 to S255 is the same as in the second embodiment.

(Operational Effects)

As described above, the plant monitoring device 20 according to the present modification example calculates a third Mahalanobis distance of a corrected added value obtained by correcting an error of an added value of second SN ratios.

By doing so, the plant monitoring device 20 can suppress an effect of an error and can more accurately calculate a third Mahalanobis distance. Therefore, the plant monitoring device 20 can more accurately determine the presence or absence of a change in the long-term tendency of the plant 1.

APPENDIX

The plant monitoring device, the plant monitoring method, and the program described in the embodiments described above are, for example, as follows.

According to a first aspect of the present disclosure, a plant monitoring device includes a detection value acquisition unit that acquires a bundle of detection values, which is a collection of detection values for each of a plurality of evaluation items, a first Mahalanobis distance calculation unit that calculates a first Mahalanobis distance of the bundle of detection values with a unit space created by a bundle of past detection values as a reference, a first SN ratio calculation unit that calculates a first SN ratio of each of the plurality of evaluation items, a second Mahalanobis distance calculation unit that increases or decreases each of the plurality of detection values to calculate a second Mahalanobis distance corresponding to each increased or decreased detection value, the second SN ratio acquisition unit that acquires a second SN ratio by performing conversion of the first SN ratio for each of the evaluation items based on the first Mahalanobis distance and the second Mahalanobis distance, and an addition unit that calculates an added value of the plurality of second SN ratios acquired in a predetermined period for each of the plurality of evaluation items.

By doing so, the plant monitoring device can easily make the operator learn a long-term tendency for each evaluation item through the added value of second SN ratios. In addition, since the plant monitoring device can show the long-term tendency of each of all the evaluation items through the added value of second SN ratios regardless of specifications of the plant, operation conditions, sensor types, and content of an evaluation item, versatility and generality can be improved.

According to a second aspect of the present disclosure, the plant monitoring device according to the first aspect further includes a plant state determination unit that determines whether a plant operation state is normal or abnormal based on whether or not the first Mahalanobis distance is equal to or smaller than a predetermined threshold value.

Accordingly, the plant monitoring device can simultaneously monitor both of the presence or absence of an abnormality of the operation state of the plant and the long-term tendency of the plant.

According to a third aspect of the present disclosure, the plant monitoring device according to the first or second aspect further includes a tendency determination unit that determines whether a detection value for each of the plurality of evaluation items tends to increase or tends to decrease based on the added value of second SN ratios.

By doing so, it is possible for the plant monitoring device to automatically diagnose the long-term tendency of the plant without the operator sequentially monitoring the added value of second SN ratios.

According to a fourth aspect of the present disclosure, in the plant monitoring device according to the third aspect, in a case where the added value of second SN ratios of the evaluation item exceeds a predetermined range, the tendency determination unit determines that a detection value of the evaluation item tends to increase when the added value of second SN ratios is a positive number and determines that the detection value of the evaluation item tends to decrease when the added value of second SN ratios is a negative number.

By doing so, since the plant monitoring device can automatically determine the long-term tendency of the detection value of each evaluation item, a monitoring load on the operator can be reduced.

According to a fifth aspect of the present disclosure, in the plant monitoring device according to the third aspect, the tendency determination unit calculates a third Mahalanobis distance of the added value of second SN ratios of the evaluation item, and in a case where the third Mahalanobis distance exceeds a predetermined threshold value, the tendency determination unit determines that a detection value of the evaluation item tends to increase when the added value of second SN ratios is a positive number and determines that the detection value of the evaluation item tends to decrease when the added value of second SN ratios is a negative number.

By doing so, since the plant monitoring device can automatically determine the presence or absence of a change in the long-term tendency based on the third Mahalanobis distance, a monitoring load on the operator can be reduced. In addition, the plant monitoring device can determine the presence or absence of a change in the long-term tendency using a general threshold value of the Mahalanobis distance. Accordingly, since it is not necessary for the operator to adjust the threshold value for each evaluation item, the versatility and generality of the plant monitoring device can be further improved.

According to a sixth aspect of the present disclosure, in the plant monitoring device according to the fifth aspect, the tendency determination unit calculates the third Mahalanobis distance of a corrected added value obtained by dividing the added value of the second SN ratios by $\sqrt{n}$ to correct an error when the number of second SN ratios added by the addition unit is n.

By doing so, the plant monitoring device can suppress an effect of the error of the second SN ratio and can more accurately calculate the third Mahalanobis distance. Therefore, the plant monitoring device can more accurately determine the presence or absence of a change in the long-term tendency of the plant.

According to a seventh aspect of the present disclosure, in the plant monitoring device according to any one of the first to sixth aspects, the second Mahalanobis distance calculation unit calculates the second Mahalanobis distance by increasing each of the plurality of detection values by a predetermined amount, and the second SN ratio acquisition unit converts the first SN ratio into the second SN ratio such that the second SN ratio is a positive number in a case where the second Mahalanobis distance is equal to or greater than the first Mahalanobis distance and such that the second SN ratio is a negative number in a case where the second Mahalanobis distance is less than the first Mahalanobis distance.

By doing so, the plant monitoring device can determine whether or not the detection value tends to be high also in relation to other detection values according to whether or not the second Mahalanobis distance increases and can reflect the tendency in the second SN ratio.

According to an eighth aspect of the present disclosure, in the plant monitoring device according to any one of the first to sixth aspects, the second Mahalanobis distance calculation unit calculates the second Mahalanobis distance by decreasing each of the plurality of detection values by a predetermined amount, and the second SN ratio acquisition unit converts the first SN ratio into the second SN ratio such that the second SN ratio is a negative number in a case where the second Mahalanobis distance is equal to or greater than the first Mahalanobis distance and such that the second SN ratio is a positive number in a case where the second Mahalanobis distance is less than the first Mahalanobis distance.

By doing so, the plant monitoring device can determine whether or not the detection value tends to be high also in relation to other detection values according to whether or not the second Mahalanobis distance decreases and can reflect the tendency in the second SN ratio.

According to a ninth aspect of the present disclosure, in the plant monitoring device according to any one of the first to eighth aspects, the second SN ratio acquisition unit sets the second SN ratio to zero in a case where the first SN ratio is a negative number.

In a case where the first SN ratio of one evaluation item is a negative number, it can be determined that an effect of the detection value of the evaluation item on increasing the first Mahalanobis distance is negligibly small. For this reason, as the plant monitoring device treats the second SN ratio of such an evaluation item of which the effect is as small as zero, processing can be simplified.

According to a tenth aspect of the present disclosure, there is provided a plant monitoring method including a step of acquiring a bundle of detection values, which is a collection of detection values for each of a plurality of evaluation items, a step of calculating a first Mahalanobis distance of the bundle of detection values with a unit space created by a bundle of past detection values as a reference, a step of calculating a first SN ratio of each of the plurality of evaluation items, a step of increasing or decreasing each of the plurality of detection values to calculate a second Mahalanobis distance corresponding to each increased or decreased detection value, a step of acquiring a second SN ratio by performing conversion of the first SN ratio for each of the evaluation items based on the first Mahalanobis distance and the second Mahalanobis distance, and a step of calculating an added value of the plurality of second SN ratios acquired in a predetermined period for each of the plurality of evaluation items.

According to an eleventh aspect of the present disclosure, there is provided a program causing a computer of a plant monitoring device to execute a step of acquiring a bundle of detection values, which is a collection of detection values for each of a plurality of evaluation items, a step of calculating a first Mahalanobis distance of the bundle of detection values with a unit space created by a bundle of past detection values as a reference, a step of calculating a first SN ratio of each of the plurality of evaluation items, a step of increasing or decreasing each of the plurality of detection values to calculate a second Mahalanobis distance corresponding to each increased or decreased detection value, a step of acquiring a second SN ratio by performing conversion of the first SN ratio for each of the evaluation items based on the first Mahalanobis distance and the second Mahalanobis distance, and a step of calculating an added value of the plurality of second SN ratios acquired in a predetermined period for each of the plurality of evaluation items.

INDUSTRIAL APPLICABILITY

According to any one of the aspects described above, it is possible to easily learn the long-term tendency while improving versatility and generality.

REFERENCE SIGNS LIST 1 plant
20 plant monitoring device
21 CPU
211 detection value acquisition unit
212 first Mahalanobis distance calculation unit
213 plant state determination unit
214 first SN ratio calculation unit
215 second Mahalanobis distance calculation unit
216 second SN ratio acquisition unit
217 addition unit
218 tendency determination unit
219 output unit
22 input and output interface
23 display unit
24 operation reception unit
25 storage unit
40 control device
900 computer

The invention claimed is:

1. A plant monitoring device comprising:
a detection value acquisition unit that acquires a bundle of detection values, which is a collection of detection values for each of a plurality of evaluation items;
a first Mahalanobis distance calculation unit that calculates a first Mahalanobis distance of the bundle of detection values with a unit space created by a bundle of past detection values as a reference;
a plant state determination unit that determines a plant operation state to be normal when the first Mahalanobis distance is equal to or smaller than a predetermined threshold value and determines the plant operation state to be abnormal when the first Mahalanobis distance is greater the predetermined threshold value;
a first SN ratio calculation unit that calculates a first SN ratio for each of the plurality of evaluation items when the plant operation state is determined to be normal;
a second Mahalanobis distance calculation unit that increases or decreases each of the plurality of detection values to calculate a second Mahalanobis distance corresponding to each increased or decreased detection value;
a second SN ratio acquisition unit that acquires a second SN ratio by performing conversion of the first SN ratio for each of the evaluation items based on the first Mahalanobis distance and the second Mahalanobis distance;
an addition unit that calculates an added value of a plurality of the second SN ratios acquired in a predetermined period for each of the plurality of evaluation items; and
an output unit that outputs an added value transition in which a plurality of the added values are arranged in time series and which indicates whether a long-term tendency of each of the plurality of detection values increases or decreases,
wherein when the second Mahalanobis distance calculation unit calculates the second Mahalanobis distance by increasing each of the plurality of detection values by a predetermined amount, the second SN ratio acquisition unit converts the first SN ratio into the second SN ratio such that the second SN ratio is a positive number in a case where the second Mahalanobis distance is equal to or greater than the first Mahalanobis distance and such that the second SN ratio is a negative number in a case where the second Mahalanobis distance is less than the first Mahalanobis distance, and
when the second Mahalanobis distance calculation unit calculates the second Mahalanobis distance by decreasing each of the plurality of detection values by a predetermined amount, the second SN ratio acquisition unit converts the first SN ratio into the second SN ratio such that the second SN ratio is a negative number in a case where the second Mahalanobis distance is equal to or greater than the first Mahalanobis distance and such that the second SN ratio is a positive number in a case where the second Mahalanobis distance is less than the first Mahalanobis distance.

2. The plant monitoring device according to claim 1, further comprising:
a tendency determination unit that determines whether the detection value for each of the plurality of evaluation items tends to increase or tends to decrease based on the added value of the second SN ratios.

3. The plant monitoring device according to claim 2, wherein in a case where the added value of the second SN ratios of the evaluation item exceeds a predetermined range, the tendency determination unit
determines that the detection value of the evaluation item tends to increase when the added value of the second SN ratios is a positive number, and
determines that the detection value of the evaluation item tends to decrease when the added value of the second SN ratios is a negative number.

4. The plant monitoring device according to claim 3, wherein when the tendency determination unit determines that the detection value of the evaluation item tends to increase or decrease, the output unit outputs warning information including a determination result of the tendency determination unit and information capable of identifying the evaluation item.

5. The plant monitoring device according to claim 2,
wherein the tendency determination unit calculates a third Mahalanobis distance of the added value of the second SN ratios of the evaluation item, and in a case where the third Mahalanobis distance exceeds a predetermined threshold value, the tendency determination unit
  determines that the detection value of the evaluation item tends to increase when the added value of the second SN ratios is a positive number, and
  determines that the detection value of the evaluation item tends to decrease when the added value of the second SN ratios is a negative number.

6. The plant monitoring device according to claim 5,
wherein the tendency determination unit calculates the third Mahalanobis distance of a corrected added value obtained by dividing the added value of the second SN ratios by Vn to correct an error when the number of the second SN ratios added by the addition unit is n.

7. The plant monitoring device according to claim 1,
wherein the second SN ratio acquisition unit sets the second SN ratio to zero in a case where the first SN ratio is a negative number.

8. A plant monitoring method comprising:
a step of acquiring a bundle of detection values, which is a collection of detection values for each of a plurality of evaluation items;
a step of calculating a first Mahalanobis distance of the bundle of detection values with a unit space created by a bundle of past detection values as a reference;
a step of determining a plant operation state to be normal when the first Mahalanobis distance is equal to or smaller than a predetermined threshold value and determining the plant operation state to be abnormal when the first Mahalanobis distance is greater the predetermined threshold value;
a step of calculating a first SN ratio for each of the plurality of evaluation items when the plant operation state is determined to be normal;
a step of increasing or decreasing each of the plurality of detection values to calculate a second Mahalanobis distance corresponding to each increased or decreased detection value;
a step of acquiring a second SN ratio by performing conversion of the first SN ratio for each of the evaluation items based on the first Mahalanobis distance and the second Mahalanobis distance;
a step of calculating an added value of a plurality of the second SN ratios acquired in a predetermined period for each of the plurality of evaluation items; and
a step of outputting an added value transition in which a plurality of the added values are arranged in time series and which indicates whether a long-term tendency of each of the plurality of detection values increases or decreases,
wherein when the second Mahalanobis distance is calculated by increasing each of the plurality of detection values by a predetermined amount in the step of calculating the second Mahalanobis distance, the step of acquiring the second SN ratio performs to convert the first SN ratio into the second SN ratio such that the second SN ratio is a positive number in a case where the second Mahalanobis distance is equal to or greater than the first Mahalanobis distance and such that the second SN ratio is a negative number in a case where the second Mahalanobis distance is less than the first Mahalanobis distance, and
when the second Mahalanobis distance is calculated by decreasing each of the plurality of detection values by a predetermined amount in the step of calculating the second Mahalanobis distance, the step of acquiring the second SN ratio performs to convert the first SN ratio into the second SN ratio such that the second SN ratio is a negative number in a case where the second Mahalanobis distance is equal to or greater than the first Mahalanobis distance and such that the second SN ratio is a positive number in a case where the second Mahalanobis distance is less than the first Mahalanobis distance.

9. A non-transitory computer readable medium storing a program that causes a computer of a plant monitoring device to execute:
a step of acquiring a bundle of detection values, which is a collection of detection values for each of a plurality of evaluation items;
a step of calculating a first Mahalanobis distance of the bundle of detection values with a unit space created by a bundle of past detection values as a reference;
a step of determining a plant operation state to be normal when the first Mahalanobis distance is equal to or smaller than a predetermined threshold value and determining the plant operation state to be abnormal when the first Mahalanobis distance is greater the predetermined threshold value;
a step of calculating a first SN ratio for each of the plurality of evaluation items when the plant operation state is determined to be normal;
a step of increasing or decreasing each of the plurality of detection values to calculate a second Mahalanobis distance corresponding to each increased or decreased detection value;
a step of acquiring a second SN ratio by performing conversion of the first SN ratio for each of the evaluation items based on the first Mahalanobis distance and the second Mahalanobis distance;
a step of calculating an added value of a plurality of the second SN ratios acquired in a predetermined period for each of the plurality of evaluation items; and
a step of outputting an added value transition in which a plurality of the added values are arranged in time series and which indicates whether a long-term tendency of each of the plurality of detection values increases or decreases,
wherein when the second Mahalanobis distance is calculated by increasing each of the plurality of detection values by a predetermined amount in the step of calculating the second Mahalanobis distance, the step of acquiring the second SN ratio performs to convert the first SN ratio into the second SN ratio such that the second SN ratio is a positive number in a case where the second Mahalanobis distance is equal to or greater than the first Mahalanobis distance and such that the second SN ratio is a negative number in a case where the second Mahalanobis distance is less than the first Mahalanobis distance, and
when the second Mahalanobis distance is calculated by decreasing each of the plurality of detection values by a predetermined amount in the step of calculating the second Mahalanobis distance, the step of acquiring the second SN ratio performs to convert the first SN ratio into the second SN ratio such that the second SN ratio is a negative number in a case where the second Mahalanobis distance is equal to or greater than the first Mahalanobis distance and such that the second SN ratio is a positive number in a case where the second Mahalanobis distance is less than the first Mahalanobis distance.

\* \* \* \* \*